(12) United States Patent
Garr

(10) Patent No.: US 9,369,021 B2
(45) Date of Patent: Jun. 14, 2016

(54) WINDING ASSEMBLY FOR AN ELECTRIC GENERATOR AND MOTOR ROTOR AND METHOD OF MAINTAINING POSITION OF A WINDING ASSEMBLY

(75) Inventor: Keith E. Garr, Rockford, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 866 days.

(21) Appl. No.: 13/468,063

(22) Filed: May 10, 2012

(65) Prior Publication Data

US 2013/0300245 A1 Nov. 14, 2013

(51) Int. Cl.
*H02K 3/34* (2006.01)
*H02K 15/06* (2006.01)

(52) U.S. Cl.
CPC ............... *H02K 3/345* (2013.01); *H02K 15/06* (2013.01); *H02K 2203/12* (2013.01)

(58) Field of Classification Search
CPC ........................ H02K 3/345; H02K 2203/15
USPC ........................................................ 310/194
See application file for complete search history.

(56) References Cited

U.S. PATENT DOCUMENTS

| 3,076,110 A | * | 1/1963 | Larson et al. | 310/194 |
| 5,144,182 A | * | 9/1992 | Lemmer et al. | 310/216.116 |
| 2010/0264773 A1 | * | 10/2010 | Hino et al. | 310/198 |

* cited by examiner

*Primary Examiner* — Terrance Kenerly
(74) *Attorney, Agent, or Firm* — Cantor Colburn LLP

(57) ABSTRACT

A winding assembly for an electric generator includes a stator core having a relatively cylindrical inner shape. Also included is a rotor core coaxially rotatable within the stator core, wherein the rotor core includes an input shaft. Further included is a rotor winding support structure on the rotor core and comprising a surface disposed at an angle relative to the input shaft and extending radially outward from the input shaft toward the stator core. Yet further included is a rotor winding bundle disposed along, and supported by, the surface of the rotor winding support structure.

12 Claims, 4 Drawing Sheets

WINDING ASSEMBLY FOR AN ELECTRIC GENERATOR AND MOTOR ROTOR AND METHOD OF MAINTAINING POSITION OF A WINDING ASSEMBLY

BACKGROUND OF THE INVENTION

The present invention relates to electric generators, and more particularly to winding assemblies for electric motors.

Electric generators typically include a rotor that rotates within a stationary set of conductors wound in coils on an iron core, referred to as a stator. A generated magnetic field cuts across the conductors, generating an induced EMF (electromotive force), as the mechanical input causes the rotor to turn. The rotating magnetic field induces an AC voltage in the stator windings. Often there are three sets of stator windings, physically offset so that the rotating magnetic field produces a three phase current, displaced by one-third of a period with respect to each other.

The rotor's magnetic field may be produced by a rotor winding energized with direct current provided by an exciter rotor. The rotor winding may tumble toward an outer diameter of the rotor during operation, due to centrifugal forces imparted on the rotor winding during rotation. Such tumbling may result in undesirable characteristics associated with the electric generator.

BRIEF DESCRIPTION OF THE INVENTION

According to one embodiment, a winding assembly for an electric generator includes a stator core having a relatively cylindrical inner shape. Also included is a rotor core coaxially rotatable within the stator core, wherein the rotor core includes an input shaft. Further included is a rotor winding support structure on the rotor core and comprising a surface disposed at an angle relative to the input shaft and extending radially outward from the input shaft toward the stator core. Yet further included is a rotor winding bundle disposed along, and supported by, the surface of the rotor winding support structure.

According to another embodiment, a method of maintaining positioning of a winding assembly is provided. The method includes forming a rotor winding bundle with a plurality of rotor winding cables. Also included is disposing the rotor winding bundle along a surface of a rotor winding support structure, wherein the surface is arranged at an angle relative to an input shaft of a rotor core, wherein the surface extends radially from the input shaft towards a stator core surrounding the rotor core in operation.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
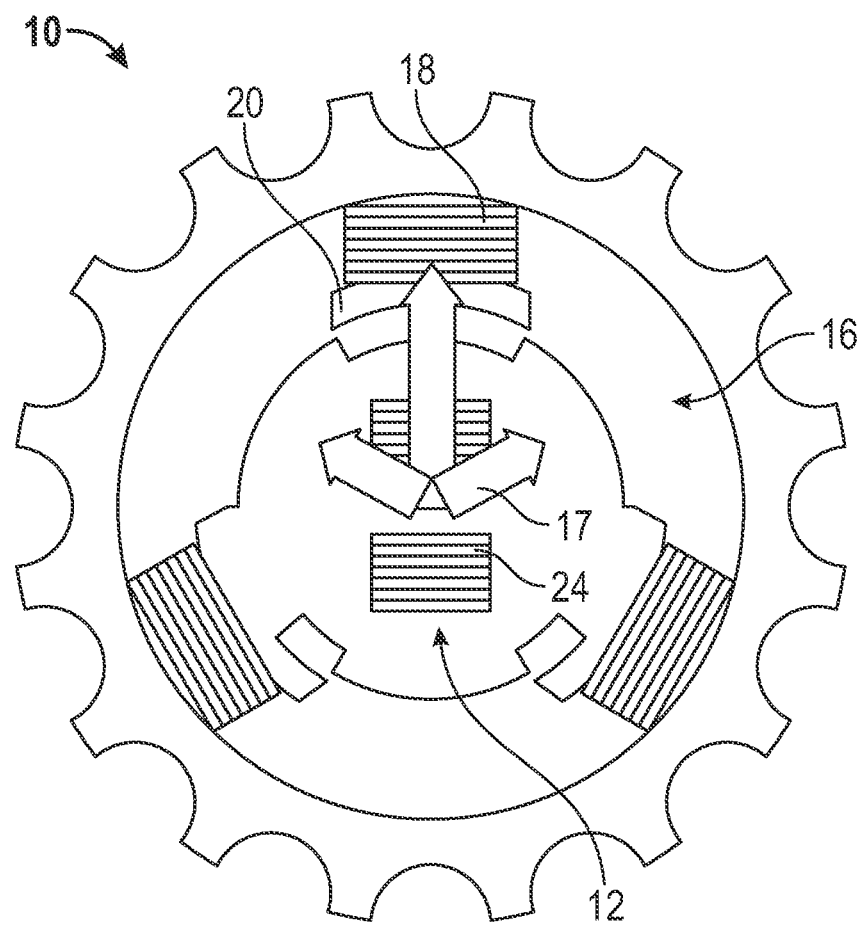
FIG. 1 is a schematic of a rotor and a stator.
Figure 2:
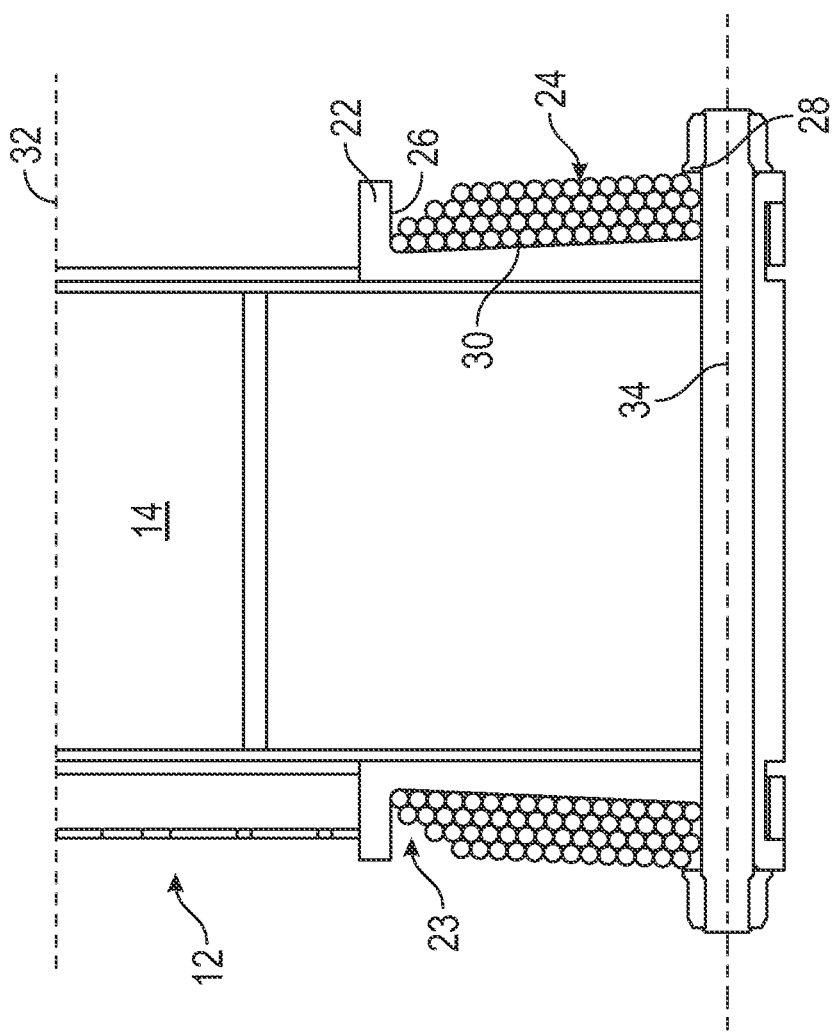
FIG. 2 is a partial, cross-sectional view of a rotor winding bundle supported by a rotor winding support structure of the rotor of FIG. 1.
Figure 3:
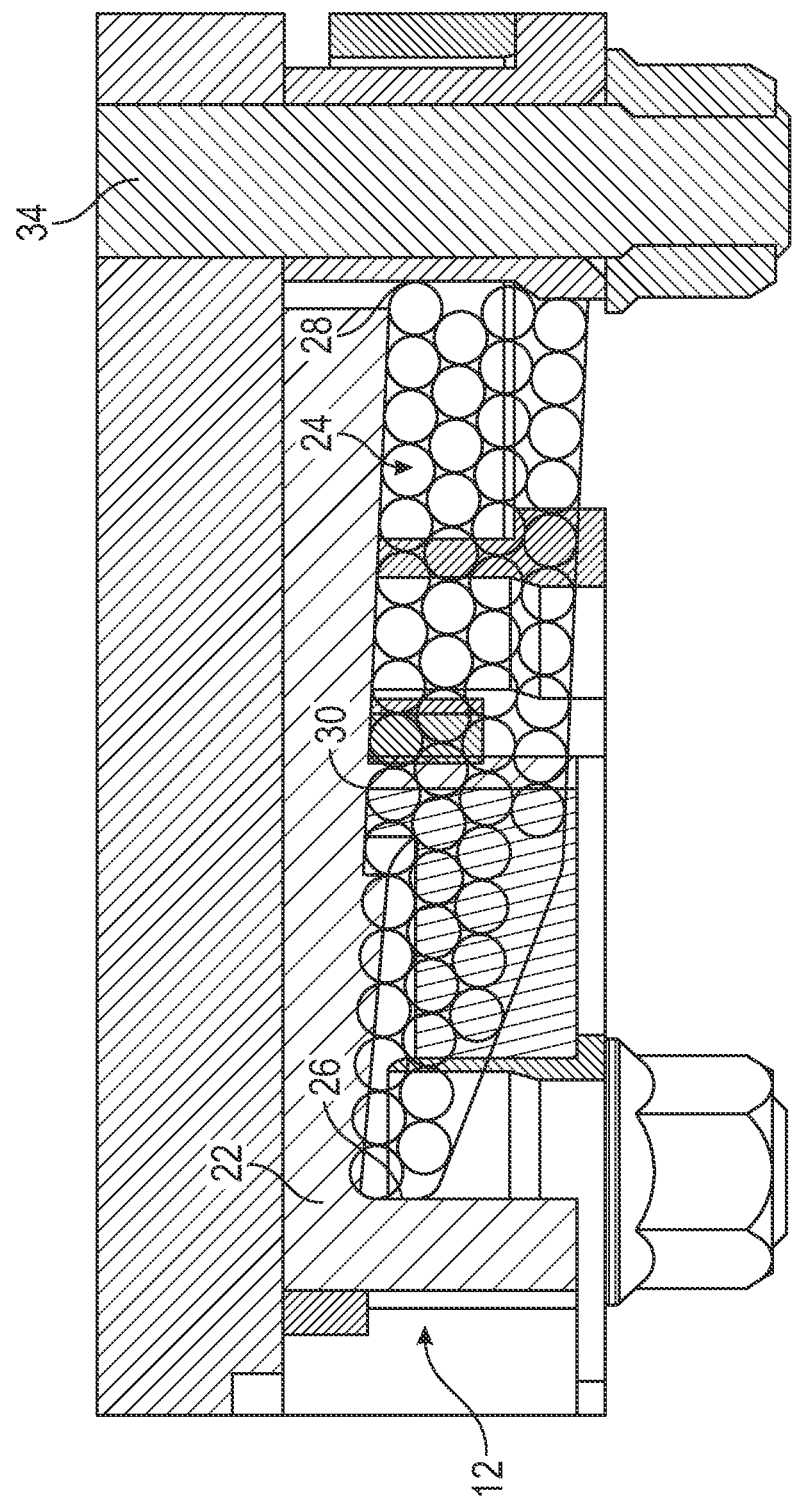
FIG. 3 is an enlarged, cross-sectional view of the rotor winding bundle of FIG. 2.

Referring to FIGS. 1-3, a portion of an electric machine (e.g., motor or generator) is schematically illustrated and referred to generally with numeral 10. The electric machine 10 includes a rotor core 12 integrally formed with or operably coupled to an input shaft 14, which may drive an external load or which may be driven by an external drive. The rotor core 12 is typically of a circular geometry, such that a close spatial proximity is maintained between an outer surface of the rotor core 12 and a stator core 16 having a relatively cylindrical shape. Maintenance of such a spatial proximity during coaxial rotation of the rotor core 12 within the stator core 16 assists in directing of magnetic fields 17 of the stator core 16 toward magnetic fields of the rotor core 12, which in turn provides rotation force to turn the rotor core 12 or vice-versa depending on whether the electric machine 10 is being operated as a motor or a generator. The rotor core 12 is rotatably disposed at a radially inwardly location of the stator core 16. The stator core 16 includes at least one stator winding 18, but as shown, a plurality of stator windings are typically present. The stator core 16 also includes a plurality of stator teeth 20 disposed at a radially inward location of each stator winding 18.

Extending axially along the input shaft 14 throughout the rotor core 12 is at least one, but typically a plurality of, rotor winding support structures 22 that extend radially outwardly of the input shaft 14, thereby forming a plurality of poles. Although illustrated as a two pole embodiment in FIG. 1, it is to be appreciated that the illustrated embodiment is merely for illustrative purposes and numerous other pole embodiments are contemplated.

Each of the rotor winding support structures 22 are configured to support and retain at least one rotor winding bundle 24. More specifically, at least one slot opening 23 extends between adjacent rotor winding support structures 22, which are circumferentially arranged from one another. The at least one rotor winding bundle 24 comprises a plurality of cables. The plurality of cables of the at least one rotor winding bundle 24 may be formed of various materials, with an exemplary material being magnet wire. The at least one rotor winding bundle 24 is substantially arranged in radial layers extending from a radially inner location 26 and a radial outer location 28 and along a surface 30 of the rotor winding support structure 22. The surface 30 of the rotor winding support structure 22 is arranged at an angle to the input shaft 14 of the rotor core 12, and more specifically at an angle to an axis of rotation 32 of the rotor core 12. Disposal of the surface 30 at an angle provides a greater resistance to any of the individual magnet wires of the at least one rotor winding bundle 24 from moving in an outwardly direction toward an outer diameter 34 of the rotor core 12. Tendency of the individual magnet wires of the at least one rotor winding bundle 24 is present based on centrifugal forces generated during acceleration and rotation of the rotor core 12 during operation. The resistance to such movement is increased by the angle of the surface 30 of the rotor winding support structure 22. As centrifugal forces are imposed on an individual magnet wire, the resultant force causes the magnet wire to move directly perpendicular to the axis of rotation 32 of the rotor core 12, with such movement being resisted by the incline of the surface 30, as well as the immediately adjacent magnet wire in the outboard direction.

It should be noted that the precise angle of the surface 30 of the rotor winding support structure 22 may vary based on the application, including any angle less than about 90 degrees, with respect to the input shaft 14 of the rotor core 12, and more specifically less than about 90 degrees with respect to the axis of rotation 32 of the rotor core 12. Alternatively, it is contemplated that the angle may be greater than 90 degrees, with respect to the input shaft 14 of the rotor core 12, and more specifically greater than about 90 degrees with respect to the axis of rotation 32 of the rotor core 12.

Accordingly, it is to be appreciated that the angle of the surface 30 reduces the likelihood of "bundling" of the at least one rotor winding bundle 24 at an outboard region proximate the outer diameter 34 of the rotor core 12, thereby ensuring maintenance of disposition of the at least one rotor winding bundle 24 in a plane perpendicular to the axis of rotation 32 of the rotor core 12.

Figure 4:
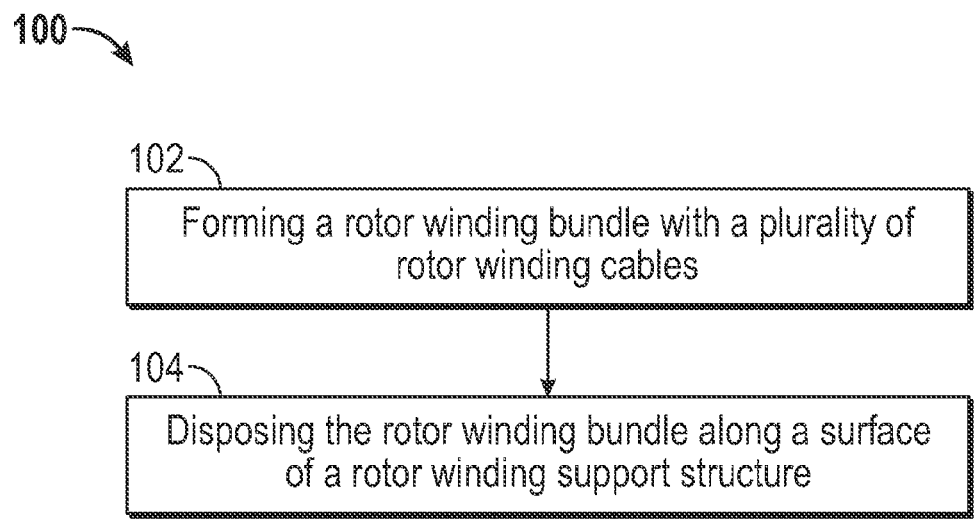
FIG. 4 is a flow diagram illustrating a method of maintaining position of the rotor winding bundle.

As illustrated in the flow diagram of FIG. 4, and with reference to FIGS. 1-3, a method of maintaining positioning of a winding assembly 100 is also provided. The rotor core 12, rotor winding support structure 22 and the rotor winding bundle 24 have been previously described and specific structural components need not be described in further detail. The method of maintaining positioning of a winding assembly 100 includes forming a rotor winding bundle with a plurality of rotor winding cables 102 and disposing the rotor winding bundle 104 along the surface 30 of the rotor winding support structure 22. As noted above, the angle of the surface provides an enhanced resistance to outward movement of the magnet wires of the rotor winding bundle 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A winding assembly for an electric generator comprising:
    a stator core having a relatively cylindrical inner shape;
    a rotor core coaxially rotatable within the stator core, wherein the rotor core includes an input shaft;
    a rotor winding support structure on the rotor core and comprising a radially inner surface, a radially outer surface and a surface extending between the radially inner surface and the radially outer surface, the surface extending radially outward from the input shaft toward the stator core, the entire length of the surface disposed at an angle that is non-perpendicular and non-parallel to an axis of rotation of the rotor core; and
    a rotor winding bundle disposed along, and supported by, the surface of the rotor winding support structure, wherein the angle relative to the input shaft is less than 90 degrees as the surface extends radially outwardly to form an incline of resistance for the rotor winding bundle, the incline of resistance extending along an entire length of the surface extending between the radially inner surface and the radially outer surface.

2. The winding assembly of claim 1, wherein the rotor winding bundle comprises a plurality of cables.

3. The winding assembly of claim 2, wherein the plurality of cables comprises a plurality of magnet wires.

4. The winding assembly of claim 1, further comprising a plurality of rotor winding support structures circumferentially spaced from each other to form at least one slot opening.

5. The winding assembly of claim 4, wherein the rotor winding bundle is disposed within the at least one slot opening.

6. The winding assembly of claim 5, wherein the at least one slot opening extends between the input shaft and an outer diameter of the rotor core.

7. A method of maintaining positioning of a winding assembly comprising:
    forming a rotor winding bundle with a plurality of rotor winding cables; and
    disposing the rotor winding bundle along a surface of a rotor winding support structure, wherein the surface extends radially between a radially inner surface and a radially outer surface, the entire length of the surface arranged at an angle that is non-perpendicular and non-parallel to an axis of rotation of the rotor core, wherein the surface extends radially from the input shaft towards a stator core surrounding the rotor core in operation, wherein the angle relative to the input shaft is less than 90 degrees as the surface extends radially outwardly to form an incline of resistance for the rotor winding bundle, the incline of resistance extending along an entire length of the surface extending between the radially inner surface and the radially outer surface.

8. The method of claim 7, wherein the plurality of cables comprises a plurality of magnet wires.

9. The method of claim 7, wherein the surface is integrally formed with a first rotor winding support structure circumferentially spaced from a second rotor winding support structure to form at least one slot opening.

10. The method of claim 9, wherein the rotor winding bundle is disposed within the at least one slot opening.

11. The method of claim 10, wherein the at least one slot opening extends between the input shaft and an outer diameter of the rotor core.

12. The method of claim 9, wherein the first rotor winding support structure is angled relative to the input shaft in an opposite direction from the second rotor winding support structure.

* * * * *